(12) United States Patent
Hamama et al.

(10) Patent No.: US 7,930,077 B2
(45) Date of Patent: Apr. 19, 2011

(54) ENGINE OIL TEMPERATURE DIAGNOSTIC METHODS AND SYSTEMS

(75) Inventors: Wajdi B. Hamama, Whitmore Lake, MI (US); John F. Van Gilder, Webberville, MI (US)

(73) Assignee: GM Global Technology Operations LLC

( * ) Notice: Subject to any disclaimer, the term of this patent is extended or adjusted under 35 U.S.C. 154(b) by 1030 days.

(21) Appl. No.: 11/738,814

(22) Filed: Apr. 23, 2007

(65) Prior Publication Data

US 2008/0262673 A1 Oct. 23, 2008

(51) Int. Cl.
*G05B 23/02* (2006.01)

(52) U.S. Cl. ............................................ 701/34; 701/31

(58) Field of Classification Search ............. 701/29–36, 701/101, 102
See application file for complete search history.

(56) References Cited

U.S. PATENT DOCUMENTS

| | | | |
|---|---|---|---|
| 7,069,141 B2 * | 6/2006 | Kunz et al. | 701/114 |
| 7,204,230 B2 * | 4/2007 | Bevan et al. | 123/350 |
| 7,677,086 B2 * | 3/2010 | Albertson et al. | 73/54.02 |

* cited by examiner

*Primary Examiner* — Richard M. Camby

(57) ABSTRACT

A control system for evaluating an engine oil temperature sensor is provided. The control system includes a first diagnostic module that selectively detects a first engine oil temperature sensor fault based on a comparison of engine coolant temperature, intake air temperature, and engine oil temperature. A reporting module selectively generates a fault report based on the first engine oil temperature sensor fault.

18 Claims, 5 Drawing Sheets

| | 64 | 66 |
|---|---|---|
| TRUE (Fast Fail) | At Power-up | IAT ≈ ECT / EOT > IAT |
| FALSE (Fast Pass) | At Power-up | EOT ≈ IAT / EOT ≈ ECT |
| FALSE (Test Pass) | At Power-up / After Drive | ECT ≈ EOT / IAT < ECT / EOT ≈ IAT / EOT ≈ ECT |
| FALSE (Test Pass) | At Power-up / After Drive | ECT ≈ IAT / EOT < ECT / EOT ≈ IAT / EOT > ECT |
| FALSE (Test Abort) | At Power-up / After Drive | ECT ≈ EOT / IAT < ECT / ECT ≈ EOT / IAT < EOT |
| FALSE (Test Abort) | At Power-up / After Drive | ECT ≈ IAT / IAT > EOT / ECT > IAT / IAT > EOT |
| TRUE (Test Fail) | At Power-up / After Drive | ECT ≈ IAT / ECT > EOT / ECT ≈ IAT / ECT > EOT |

*Figure 3*

ENGINE OIL TEMPERATURE DIAGNOSTIC METHODS AND SYSTEMS

FIELD

The present disclosure relates to engine control systems and more particularly to engine control systems for evaluating an engine oil temperature sensor.

BACKGROUND

The statements in this section merely provide background information related to the present disclosure and may not constitute prior art.

Some vehicles include internal combustion engines. Internal combustion engines combust a mixture of air and fuel within engine cylinders. In some cases, a spark generated by a spark plug ignites the mixture of air and fuel within the cylinders to cause the combustion. The combustion causes pistons within the cylinders to drive a crankshaft. The crankshaft produces torque for the vehicle.

Most internal combustion engines include engine oil. Engine oil is used as a lubricant to prevent the wearing away of contacting parts after prolonged operation. The engine oil can also serve as a coolant by carrying heat away from the contacting parts. An engine oil temperature sensor is provided on the engine to indicate a temperature of the engine oil. The engine oil temperature can be used to indicate the temperature of the engine. To ensure that the engine oil temperature sensor is operating efficiently and without faults, and to be compliant with recent requirements of many regulatory bodies, an engine oil temperature diagnostic should be implemented by an engine control system. The engine oil temperature diagnostic should be performed while the engine is running or the engine controller is powered and the engine is off.

SUMMARY

Accordingly, a control system for evaluating an engine oil temperature sensor is provided. The control system includes a first diagnostic module that selectively detects a first engine oil temperature sensor fault based on a comparison of engine coolant temperature, intake air temperature, and engine oil temperature. A reporting module selectively generates a fault report based on the first engine oil temperature sensor fault.

In other features, a control system for evaluating an engine oil temperature sensor is provided. The control system includes a first diagnostic module that selectively detects a first engine oil temperature sensor fault based engine oil temperature and mass airflow. A reporting module selectively generates a fault report based on the first engine oil temperature sensor fault.

In still other features, a method of evaluating an engine oil temperature sensor is provided. The method includes: comparing engine coolant temperature, intake air temperature, and engine oil temperature; and selectively detecting an engine oil temperature sensor fault based on at least one of the comparing engine coolant temperature, intake air temperature, and engine oil temperature.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 3 is a table illustrating engine oil temperature diagnostic evaluation criteria that can be performed by a cold start diagnostic module of the engine oil temperature diagnostic system.

DETAILED DESCRIPTION

Figure 1:
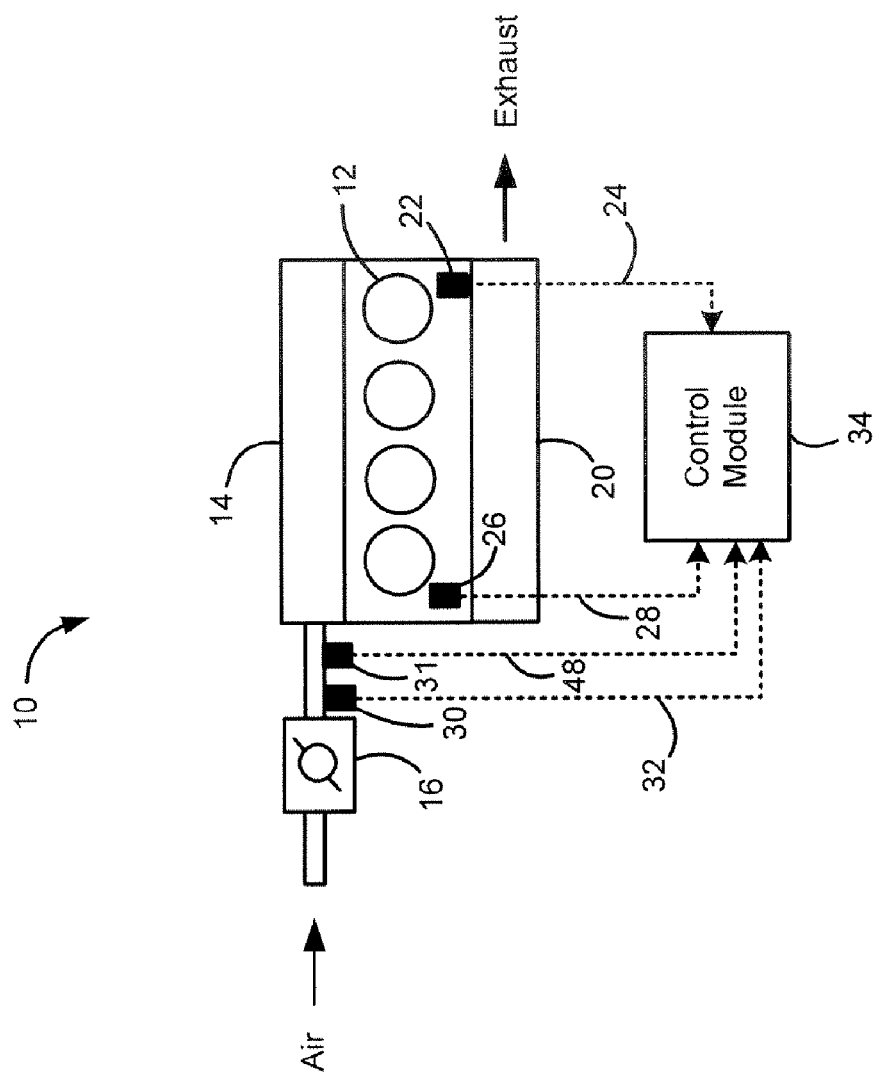
FIG. 1 is a functional block diagram illustrating an exemplary engine system including an engine oil temperature diagnostic system of the present disclosure.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although four cylinders 18 are illustrated, it can be appreciated that the engine 12 can have a plurality of cylinders 18 including, but not limited to, 2, 3, 5, 6, 8, 10, 12 and 16 cylinders. It is also appreciated that the engine 12 may, in the alternative, include a V-type cylinder configuration.

The air within the cylinders 18 is mixed with fuel and combusted therein. Combustion exhaust within the cylinders 18 is forced out through an exhaust manifold 20. The combustion exhaust is treated in an exhaust system (not shown). The engine 12 includes engine oil for lubrication of the mechanical components. An engine oil temperature sensor 22 generates an engine oil temperature signal 24 based on a temperature of the engine oil. The engine 12 includes engine coolant to prevent the engine 12 from over-heating. An engine coolant temperature sensor 26 generates an engine coolant temperature signal 28 based on the temperature of the engine coolant. An intake air temperature sensor 30 generates an intake air temperature signal 32 based on the temperature of air entering the engine 12. A mass airflow sensor 31 generates a mass airflow signal 48 based on the mass of air flowing into the engine 12. A control module 34 receives the above mentioned signals 24, 28, 32, and 48 and evaluates the engine oil temperature sensor 22 based on engine oil temperature diagnostic methods and systems of the present disclosure.

Figure 2:
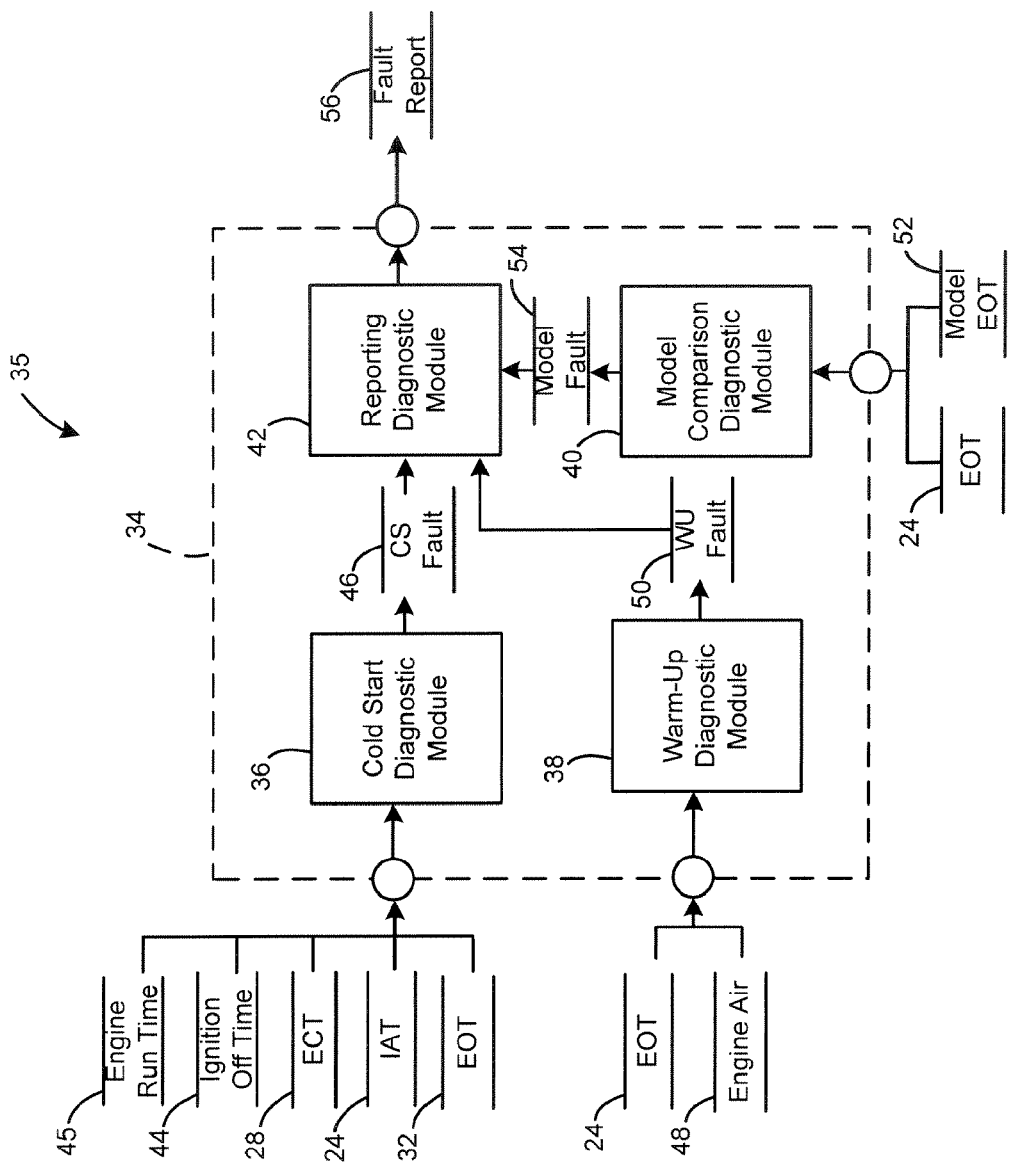
FIG. 2 is a dataflow diagram illustrating an exemplary engine oil temperature diagnostic system of the present disclosure.

Referring now to FIG. 2, a dataflow diagram illustrates various embodiments of an engine oil temperature diagnostic system 35 that may be embedded within the control module 34. Various embodiments of engine oil temperature diagnostic systems 35 according to the present disclosure may include any number of sub-modules embedded within the control module 34. The sub-modules shown may be combined and/or further partitioned to similarly evaluate the engine oil temperature sensor 22 of FIG. 1. Inputs to the system may be sensed from the engine system 10 (FIG. 1), received from other control modules (not shown), and/or determined by other sub-modules (not shown) within the control module 34. In various embodiments, the control module 34 of FIG. 2 includes a cold start diagnostic module 36, a warm-up diagnostic module 38, a model comparison diagnostic module 40, and a reporting module 42.

The cold start diagnostic module 36 receives as input an ignition off time 44, an engine run time 45, engine coolant temperature 28, intake air temperature 32, and engine oil temperature 24. The cold start diagnostic module 36 selectively sets a cold start fault 46 after evaluating the intake air temperature 32, the engine oil temperature 24, and the engine coolant temperature 28 based on the ignition off time 44 and the engine run time 45, as will be discussed further below.

The warm-up diagnostic module 38 receives as input engine oil temperature 24 and mass airflow 48. The warm-up diagnostic module 38 selectively sets a warm-up fault 50 based on the engine oil temperature 24 and the mass airflow 48. The warm-up diagnostic module 38 determines whether the engine oil temperatures sensor 22 (FIG. 1) is stuck in a range. For example, the warm-up diagnostic module 38 verifies that the engine oil temperature 24 (FIG. 1) will reach a target temperature after the engine 12 (FIG. 1) consumes a minimum threshold of air.

The model comparison diagnostic module 40 receives as input engine oil temperature 24 and a model engine oil temperature 52. As can be appreciated, the model engine oil temperature 52 can be determined based on engine oil temperature models and engine operating parameters as known in the art. The model comparison diagnostic module 40 continually compares the engine oil temperature 24 with the model engine oil temperature 52. The model comparison diagnostic module 40 selectively sets a model fault 54 based on the comparison between the engine oil temperature 24 and the model engine oil temperature 52.

The reporting module 42 receives as input the cold start fault 46, the warm-up fault 50, and the model fault 54. Based on the inputs 46, 50, and 54, the reporting module 42 selectively generates a fault report 56 indicating whether an engine oil temperature sensor fault has occurred. For example, if at least one of the cold start fault 46, the warm-up fault 50, or the model fault 54 indicates an engine oil temperature fault, the fault report 56 indicates Test Fail. If not one of the cold start fault 46, the warm-up fault 50, and the model fault 54 indicate an engine oil temperature sensor fault, the fault report 56 indicates Test Pass. As can be appreciated, once the fault report 56 indicates Test Fail, additional steps can be performed by the engine oil temperature diagnostic system 35 to notify other systems and users of the failure. In various embodiments, a diagnostic code is set based on the fault report 56. The diagnostic code can be retrieved by a service tool or transmitted to a remote location via a telematics system. In various other embodiments, an indicator lamp is illuminated based on the fault report 56. In various other embodiments, an audio warning signal is generated based on the fault report 56.

Referring now to FIG. 3 and with continued reference to FIG. 2, a table illustrates engine oil temperature diagnostic evaluation criteria that can be performed by the cold start diagnostic module 36 of the engine oil temperature diagnostic system 35. As can be appreciated, the evaluation criteria can be performed once the ignition off time 44 indicates that the engine 12 (FIG. 1) was off for a predetermined amount of time. Column 60 lists possible values for the cold start fault 46. The cold start fault 46 can be set to FALSE indicating a Test Pass or Aborted Test, or set to TRUE indicating a Test Fail. Column 62 lists the engine run conditions. The engine run conditions are determined based on the engine run time 45 and can be at least one of at power-up or after drive. Column 64 lists the comparison criteria for each engine run condition that generate a particular cold start fault 46. For example, at row 68, if at power up, the intake air temperature 32 is substantially equal to the engine coolant temperature 28 and the engine oil temperature 24 is greater than the intake air temperature 32, the cold start fault 46 is set to TRUE or Test Fail. At row 70 if at power-up, the engine oil temperature 24 is substantially close to the intake air temperature 32 and the engine oil temperature 24 is substantially close to the engine coolant temperature 28, the cold start fault 46 is set to FALSE or Test Pass. As can be appreciated, the cold start diagnostic module 36 can perform an evaluation of any combination of the various evaluation criteria listed in FIG. 3.

Figure 4:
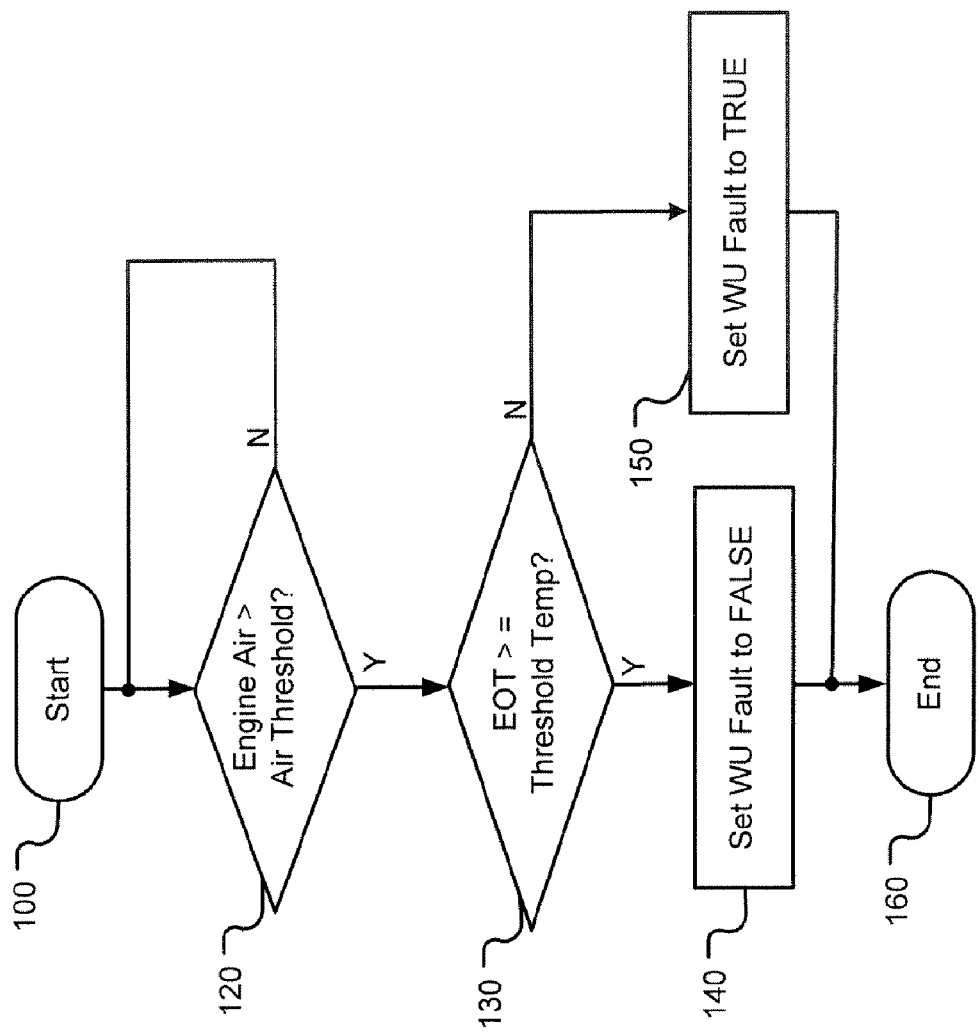
FIG. 4 is a flowchart illustrating an engine oil temperature diagnostic method that can be performed by a warm-up diagnostic module of the engine oil temperature diagnostic system.

Referring now to FIG. 4 and with continued reference to FIG. 2, a flowchart illustrates an exemplary engine oil temperature diagnostic method that can be performed by the warm-up diagnostic module 38 of the engine oil temperature diagnostic system 35. The method may run continually or periodically based on scheduled events. For example, the method may be schedule to run after the engine has warmed up. The method may begin at 100. The mass airflow 48 is evaluated at 120. If the mass airflow 48 exceeds a predetermined air threshold at 120, the engine oil temperature 24 is evaluated at 130. Otherwise the method loops back and continually monitors the mass airflow 48 at 120. At 130, if the engine oil temperature 24 is greater than or equal to a predetermined temperature threshold, the warm-up fault 50 is set to FALSE at 140. Otherwise, if the engine oil temperature 24 is less than the temperature threshold at 130, the warm-up fault 50 is set to TRUE at 150. The method may end at 160.

Figure 5:
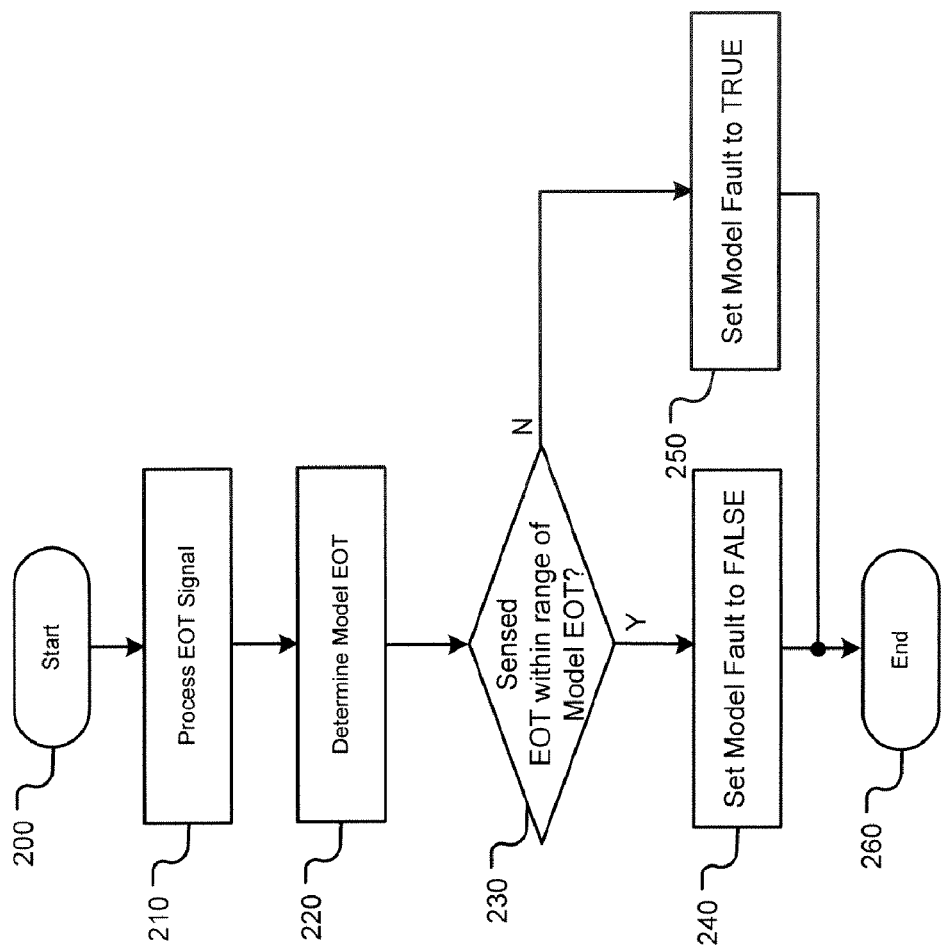
FIG. 5 is a flowchart illustrating an engine oil temperature diagnostic method that can be performed by a model comparison diagnostic module of the engine oil temperature diagnostic system.

Referring now to FIG. 5 and with continued reference to FIG. 2, a flowchart illustrates an exemplary engine oil temperature diagnostic method that can be performed by the model comparison diagnostic module 40 of the engine oil temperature diagnostic system 35. The method may be scheduled to run continually during engine operation. The method may begin at 200. The engine oil temperature 24 is processed at 210. The model engine oil temperature 52 is processed at 220. The engine oil temperature 24 and the model engine oil temperature 52 are compared at 230. If the engine oil temperature 24 is within a predetermine range of the model engine oil temperature 52 at 230, the model fault 54 is set to FALSE at 240. Otherwise, if the engine oil temperature 24 is outside of the predetermined range of the model engine oil temperature 52 at 230, the model fault 54 is set to TRUE at 250. The method may end at 260.

As can be appreciated, all comparisons discussed with regard to FIGS. 3, 4, and 5 can be implemented in various forms depending on the selected values for comparison. For example, a comparison of "greater than" may be implemented as "greater than or equal to" in various embodiments. Similarly, a comparison of "less than" may be implemented as "less than or equal to" in various embodiments. A comparison of "within a range" may be equivalently implemented as a comparison of "less than or equal to a maximum threshold" and "greater than or equal to a minimum threshold" in various embodiments.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control system for evaluating an engine oil temperature sensor, comprising:
   a first diagnostic module that selectively detects a first engine oil temperature sensor fault based on a comparison of engine coolant temperature, intake air temperature, and engine oil temperature; and
   a reporting module that selectively generates a fault report based on the first engine oil temperature sensor fault.

2. The control system of claim 1 further comprising:
   a second diagnostic module that selectively detects a second engine oil temperature sensor fault based on engine oil temperature and mass airflow,
   wherein the reporting module selectively generates the fault report based on the second engine oil temperature sensor fault.

3. The control system of claim 1 further comprising:
   a second diagnostic module that selectively detects a second engine oil temperature sensor fault based on a modeled engine oil temperature and a sensed engine oil temperature,
   wherein the reporting module selectively generates the fault report based on the second engine oil temperature sensor fault.

4. The control system of claim 2 further comprising:
   a third diagnostic module that selectively detects a third engine oil temperature sensor fault based on a modeled engine oil temperature and a sensed engine oil temperature,
   wherein the reporting module selectively generates the fault report based on at least one of the first, the second, and the third engine oil temperature sensor faults.

5. The control system of claim 4 wherein the first diagnostic module selectively detects the first engine oil temperature sensor fault after the engine has powered up, wherein the second diagnostic module selectively detects the second engine oil temperature sensor fault after the engine has warmed up, and wherein the third diagnostic module selectively detects the third engine oil temperature sensor fault during engine operation.

6. The control system of claim 1 wherein the first diagnostic module selectively detects the first engine oil temperature sensor fault based on ignition off time.

7. The control system of claim 1 wherein the first diagnostic module selectively detects the first engine oil temperature sensor fault based on engine run time.

8. A control system for evaluating an engine oil temperature sensor, comprising:
   a first diagnostic module that selectively detects a first engine oil temperature sensor fault based engine oil temperature and mass airflow; and
   a reporting module that selectively generates a fault report based on the first engine oil temperature sensor fault.

9. The control system of claim 8 further comprising:
   a second diagnostic module that selectively detects a second engine oil temperature sensor fault based on a modeled engine oil temperature and a sensed engine oil temperature,
   wherein the reporting module selectively generates the fault report based on at least one of the first engine oil temperature fault and the second engine oil temperature fault.

10. The control system of claim 9 wherein the first diagnostic module selectively detects the first engine oil temperature sensor fault after the engine has warmed up and wherein the second module selectively detects the second engine oil temperature sensor fault during engine operation.

11. A method of evaluating an engine oil temperature sensor, comprising:
    selectively detecting a first engine oil temperature sensor fault based on a comparison of engine coolant temperature, intake air temperature, and engine oil temperature; and
    selectively generating a fault report based on the first engine oil temperature sensor fault.

12. The method of claim 11 further comprising:
    selectively detecting a second engine oil temperature sensor fault based on engine oil temperature and mass airflow; and
    selectively generating the fault report based on the second engine oil temperature sensor fault.

13. The method of claim 12 further comprising:
    selectively detecting a third engine oil temperature sensor fault based on a modeled engine oil temperature and a sensed engine oil temperature; and
    selectively generating the fault report based on at least one of the first, second, and third engine oil temperature sensor faults.

14. The method of claim 11 wherein the selectively detecting the first engine oil temperature fault based on engine coolant temperature, intake air temperature, and engine oil temperature occurs during a first predetermined engine run period.

15. The method of claim 11 wherein the selectively detecting the first engine oil temperature fault based on engine coolant temperature, intake air temperature, and engine oil temperature occurs after a predetermined ignition off period.

16. The method of claim 12 wherein the selectively generating the first engine oil temperature fault based on engine coolant temperature, intake air temperature, and engine oil temperature occurs during a first predetermined engine run period, and wherein the selectively detecting the second engine oil temperature fault based on mass airflow and engine oil temperature occurs during a second predetermined engine run period.

17. The method of claim 13 wherein the selectively detecting the first engine oil temperature fault based on engine coolant temperature, intake air temperature, and engine oil temperature occurs during a first predetermined engine run period, wherein the selectively detecting the second engine oil temperature fault based on mass airflow and engine oil temperature occurs during a second predetermined engine run period, and wherein the selectively detecting the third engine oil temperature fault based on the modeled engine oil temperature and the sensed engine oil temperature occurs continually during engine operation.

18. The method of claim 11, further comprising:
    selectively detecting a second engine oil temperature sensor fault based on a modeled engine oil temperature and a sensed engine oil temperature; and
    selectively generating the fault report based on the second engine oil temperature fault.

* * * * *